(12) United States Patent
Yamasaki et al.

(10) Patent No.: US 6,658,842 B2
(45) Date of Patent: Dec. 9, 2003

(54) HYDRAULIC SYSTEM

(75) Inventors: Masaru Yamasaki, Chiyoda (JP);
Kenichiro Tokuo, Chiyoda (JP);
Hiroshi Kuroiwa, Hitachi (JP);
Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/080,557

(22) Filed: Feb. 25, 2002

(65) Prior Publication Data
US 2003/0056640 A1 Mar. 27, 2003

(30) Foreign Application Priority Data
Sep. 25, 2001 (JP) ......................... 2001-290527

(51) Int. Cl.$^7$ ............................... F15B 21/04
(52) U.S. Cl. ............... 60/453; 91/431; 91/437
(58) Field of Search ............... 60/453; 91/431, 91/437

(56) References Cited
U.S. PATENT DOCUMENTS
6,079,206 A * 6/2000 Petrzik et al. ............... 60/453

FOREIGN PATENT DOCUMENTS
DE 4439454 5/1996

OTHER PUBLICATIONS

Patent Abstracts of Japan, vol. 014, No. 464 (M–1033) Oct. 9, 1990 & JP 02 186108 (Hitachi Ltd) Jul. 20, 1990.

Patent Abstracts of Japan, vol. 012, No. 325 (M–737) Sep. 5, 1998 & JP 63 092804 (Komatsu Ltd.) Apr. 23, 1988.

* cited by examiner

Primary Examiner—Edward K. Look
Assistant Examiner—Thomas E. Lazo
(74) Attorney, Agent, or Firm—Antonelli, Terry, Stout & Kraus, LLP

(57) ABSTRACT

A hydraulic system includes an air sucking hydraulic circuit 8, an air sucking control valve 5, and a check valve 6 provided in or before and after the air sucking hydraulic circuit 8, hereby allowing a hydraulic fluid from the air sucking control valve 5 to flow to the hydraulic actuator 4 and preventing a flow of a hydraulic fluid from the hydraulic actuator 4 to the air sucking control valve 5.

5 Claims, 3 Drawing Sheets

HYDRAULIC SYSTEM

BACKGROUND OF THE INVENTION

The present invention relates to a hydraulic system, and, more particularly, to a hydraulic system that is suited to perform a clutch operation or variable clutch operation in an automobile automatic transmission.

A hydraulic system is not hermetically sealed, so that air may enter the hydraulic circuit. In general, a hydraulic circuit is a so-called blind circuit which is closed at the hydraulic side, so that a hydraulic fluid can not circulate in the hydraulic circuit and hydraulic actuator. Thus, air which enters the hydraulic circuit and the hydraulic actuator is unlikely to be exhausted out of the circuit, and so it tends to remain therein. Such air in the circuit may delay the response of the hydraulic system and degrade the controllability of the system.

To solve the above-mentioned problem, several techniques have been proposed in which an additional circuit is provided to circulate the hydraulic fluid in the hydraulic circuit in such a way as to exhaust the air out of it, and this is referred to as an air sucking operation herein. As an example of such conventional techniques, Japanese Application Patent Laid-Open Publication No. Hei 10-73105 discloses a hydraulic operation unit which comprises a piston/cylinder having a first chamber and second chamber, and another piston/cylinder having a third chamber. In this operation unit, the first and second chambers are connected via a first pressure valve, and the first and third chambers are connected via a conduit in which a second pressure valve is provided. The first, second, and third chambers have first, second, and third directional control valves, respectively. The valves can control the hydraulic pressure for actuating the piston/cylinders. Those directional control valves are connected to a hydraulic fluid container via a pump. To evacuate the first and third chambers, the first and third directional control valves connect those chambers to the pump. The second directional control valve connects the second chamber to the hydraulic fluid container. Pressure higher than a pressure which is present during normal operation is applied to actuate the first and second pressure valves.

In the above-described hydraulic operation unit, the piston/cylinder may operate during the air sucking operation, so that an accidental operation of the hydraulic actuator during the air sucking operation must be prevented.

SUMMARY OF THE INVENTION

It is an object of the present invention to provide a hydraulic system having a reliable air sucking mechanism which is unlikely to malfunction.

To achieve the above mentioned object, the present invention provides a hydraulic system comprising, a hydraulic actuator activated by a supplied hydraulic fluid, a control valve for generating a regulated hydraulic pressure or flow for activating the hydraulic actuator, and a control hydraulic circuit for transmitting the regulated hydraulic pressure or flow generated by the control valve to the hydraulic. The control hydraulic circuit includes an air sucking control valve connected to a primary pressure circuit or regulated pressure circuit, an air sucking hydraulic circuit connecting the air sucking control valve to the hydraulic actuator, and a check valve between the air sucking control valve and the hydraulic actuator, which allows a flow of hydraulic fluid from the air sucking control valve to the hydraulic actuator and prevents a flow of hydraulic fluid from the hydraulic actuator to the air sucking control valve.

DESCRIPTION OF THE INVENTION

One embodiment of the present invention will be described with reference to FIG. 1.

Figure 1:
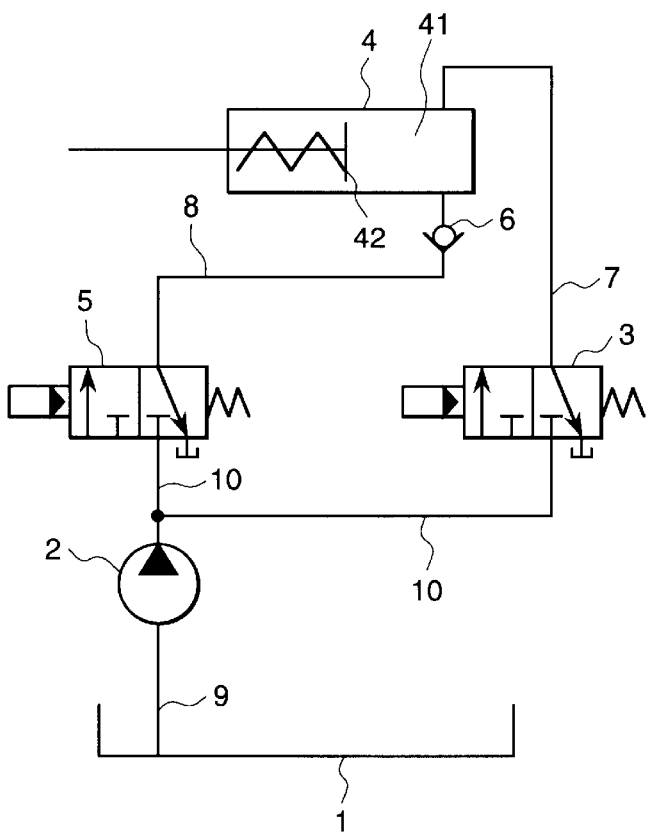
FIG. 1 is a schematic diagram showing an example of a hydraulic system having an air sucking mechanism according to the present invention.

FIG. 1 shows an example of a hydraulic system according to the present invention using hydraulic symbols. A hydraulic tank 1 contains a hydraulic fluid. A hydraulic pump 2, which is driven by a power supply (not shown), can suck the hydraulic fluid from the hydraulic tank 1 via a suction circuit 9 and raise its pressure. The high pressure fluid is supplied to a control valve 3 and to an air sucking control valve 5 through a primary pressure circuit 10.

The primary pressure circuit 10 is a circuit through which the high pressure hydraulic fluid, that is raised in pressure by the hydraulic pump 2, will flow. Thus, the primary pressure circuit 10 is also called a high pressure circuit. This primary pressure circuit 10 also includes a circuit in which a hydraulic fluid flows with a pressure which is regulated in a pressure valve after it has been raised in the hydraulic pump 2.

The (not shown) power supply is controlled by a control unit (not shown) such that the hydraulic pump 2 can supply hydraulic fluid to the primary pressure circuit 10 at a constant pressure. The control valve 3 is activated by an electrical signal from a control unit (not shown), and it can control the hydraulic fluid in response to the applied signal. The control valve 3 can supply hydraulic fluid to a hydraulic chamber 41 of a hydraulic actuator 4 via a control hydraulic circuit 7. The control valve 3 may be a pressure control valve which can generate a hydraulic pressure in response to an electrical signal received from the (not shown) control unit, or a flow control valve which can generate a hydraulic flow in response to an electrical signal received from the (not shown) control unit.

In the hydraulic actuator 4, a piston 42 will be pushed forward (to the left in the drawing) by the hydraulic fluid supplied from the control valve 3, and the piston 42 will be returned back (to the right) by a built-in spring when the application of fluid is stopped. The hydraulic chamber 41 of the hydraulic actuator 4 has another hydraulic fluid port, which is connected to the air sucking control valve 5 via a check valve 6 and an air sucking hydraulic circuit 8.

The check valve 6 can prevent a flow of hydraulic fluid from the hydraulic actuator 4 to the air sucking control valve 5 and allow a reverse flow of hydraulic fluid from the control valve 5 for air sucking to the hydraulic actuator 4.

The air sucking control valve 5 may be a pressure control valve which can generate a hydraulic pressure in response to an electrical signal received from the (not shown) control unit, or a flow control valve which can generate a hydraulic flow in response to an electrical signal received from the (not shown) control unit, or an on/off control valve which can turn on/off the flow of the hydraulic fluid in response to an electrical signal received from the (not shown) control unit.

In the above mentioned configuration, according to the present invention, the air sucking operation from the hydraulic chamber 41 of the hydraulic actuator 4 occurs as follows.

In the normal control operation of the hydraulic actuator 4, the control valve 3 receives an electrical signal, in response to which it will supply hydraulic fluid to the hydraulic chamber 41 of the hydraulic actuator 4. The piston 42 of the hydraulic actuator 4 will be pushed forward by the hydraulic fluid supplied thereto. The control valve 3 receives an alternative signal, such that the control valve 3 can also receive hydraulic fluid from the hydraulic actuator 4. Thus, the piston 42 in the hydraulic actuator 41 will be returned back by the force of the built-in spring. In the air sucking operation, the control valve 3 receives an electrical signal that causes it to receive hydraulic fluid from the hydraulic actuator 4, and the air sucking control valve 5 receives an electrical signal that causes it to supply hydraulic fluid to the hydraulic chamber 41 of the hydraulic actuator 4. In this state, the hydraulic fluid can circulate through a path from the hydraulic tank 1 via the suction circuit 9, hydraulic pump 2, primary pressure circuit 10, air sucking control valve 5, air sucking hydraulic circuit 8, and check valve 6, to the hydraulic actuator 4, and from this hydraulic actuator 4, the hydraulic fluid flows via the control hydraulic circuit 7 and control valve 3, back to the hydraulic tank 1. Thus, the air which exists in the hydraulic chamber 41 of the hydraulic actuator 4 and the control hydraulic circuit 7 will be exhausted into the hydraulic tank 1 by the circulation flow of the hydraulic fluid. During the air sucking operation, the control valve 3 can receive hydraulic fluid from the hydraulic actuator 4. Thus, the pressure in the hydraulic actuator 4 will not increase and the hydraulic actuator 4 will not operate. After the air sucking operation, the air sucking control valve 5 receives an electrical signal that causes it to close, or the air sucking hydraulic circuit 8 can communicate with the circuit from the air sucking control valve 5 to the hydraulic tank 1. In normal operation, the check valve 6 is closed so that the hydraulic fluid can not flow into the air sucking hydraulic circuit 8 from the hydraulic actuator 4, thus the controllability of the hydraulic system will not be degraded.

As described above, according to the embodiment, a simple hydraulic circuit can perform an air sucking operation using only electrical signals received from the control unit, and it can remove the air in the hydraulic system so as to prevent degradation of the system controllability due to the presence of air. Thus, a reliable hydraulic system is provided which can prevent a malfunction of the hydraulic actuator during the air sucking operation.

Another embodiment of the present invention will be described with reference to FIG. 2.

Figure 2:
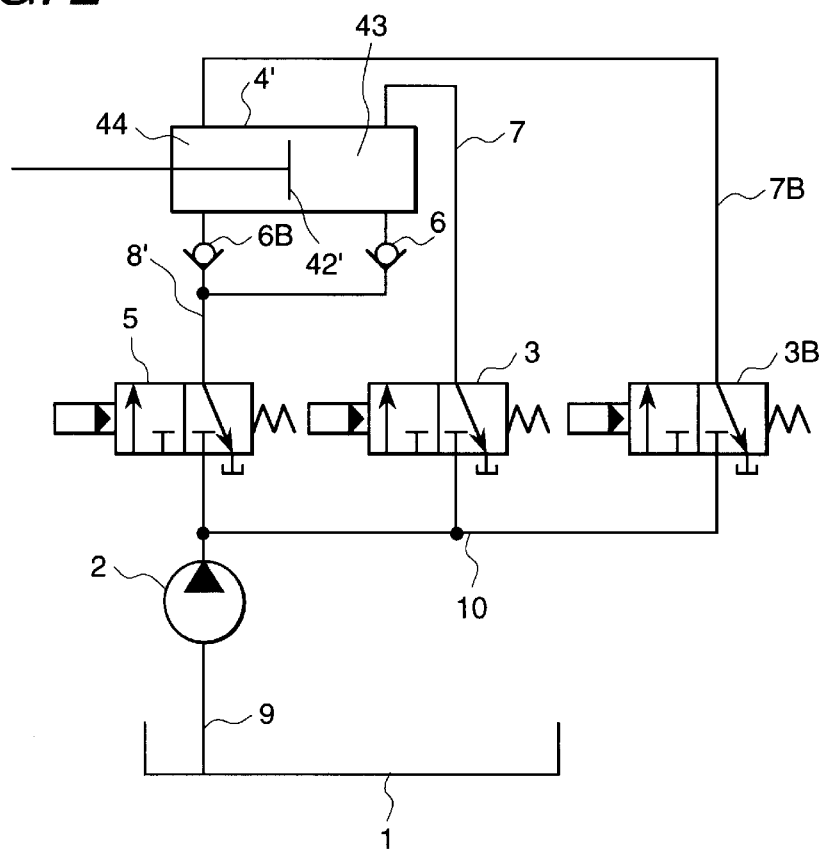
FIG. 2 is a schematic diagram showing another example of a hydraulic system having an air sucking mechanism according to the present invention.

FIG. 2 shows an example of a hydraulic system according to the present invention using hydraulic symbols. A hydraulic tank 1 contains a hydraulic fluid. A hydraulic pump 2, which is driven by a power supply (not shown), can suck the hydraulic fluid from the hydraulic tank 1 via a suction circuit 9 and raise its pressure. The raised high pressure fluid is supplied to a control valve 3, second control valve 3B, and air sucking control valve 5 through a primary pressure circuit 10. The (not shown) power supply is controlled by a control unit (not shown) such that the hydraulic pump 2 can supply hydraulic fluid to the primary pressure circuit 10 at a constant pressure.

The control valve 3 and second control valve 3B are activated by electrical signals from a control unit (not shown), and they can control the flow of hydraulic fluid in response to the received signals. The control valve 3 and second control valve 3B can supply fluid to a hydraulic actuator 4' via control hydraulic circuits 7 and 7B, respectively. Each of the control valve 3 and second control valve 3B may be a pressure control valve which can generate hydraulic pressure in response to an electrical signal received from the (not shown) control unit, or a flow control valve which can generate a hydraulic flow in response to an electrical signal received from the (not shown) control unit.

In the hydraulic actuator 4', a piston 42' will be pushed forward by the hydraulic fluid supplied from the control valve 3, and the piston 42' will be returned back by the hydraulic fluid supplied from the second control valve 3B. Each of the hydraulic chambers 43, 44 of the hydraulic actuator 4' has another hydraulic fluid port which is connected to the air sucking control valve 5 via a check valve 6 or a second check valve 6' and an air sucking hydraulic circuit 8'.

The check valve 6 and second check valve 6B each can prevent a flow of the hydraulic fluid from the hydraulic actuator 4' to the air sucking control valve 5 and allow a reverse flow of the hydraulic fluid from the air sucking control valve 5 to the hydraulic actuator 4'.

The air sucking control valve 5 may be a pressure control valve which can generate a hydraulic pressure in response to an electrical signal received from the (not shown) control unit, or a flow control valve which can generate a hydraulic flow in response to an electrical signal received from the (not shown) control unit, or an on/off control valve which can turn on/off the flow of the hydraulic fluid in response to an electrical signal received from the (not shown) control unit.

In the above mentioned configuration, according to the present invention, the air sucking operation from the hydraulic actuator 4' is as follows.

In the normal control operation of the hydraulic actuator 4, the control valve 3 can receive an electrical signal which causes it to supply hydraulic fluid into the hydraulic chamber 43 of the hydraulic actuator 4', and the second control valve 3B can receive an electrical signal which causes it to receive hydraulic fluid from the hydraulic chamber 44 of the hydraulic actuator 4'. The piston 42' of the hydraulic actuator 4' will be pushed forward by the hydraulic fluid supplied from the control valve 3. The control valve 3 and second control valve 3B can receive alternative signals such that the second control valve 3B can supply hydraulic fluid to the hydraulic chamber 44 of the hydraulic actuator 4' and the control valve 3 can receive hydraulic fluid from the hydraulic chamber 43 of the hydraulic actuator 4'. Then, the piston 42' of the hydraulic actuator 4' will be returned back by the hydraulic fluid supplied from the second control valve 3B.

In the air sucking operation, the control valve 3 and second control valve 3B both receive electrical signals such that the control valve 3 and second control valve 3B both receive the hydraulic fluid from the hydraulic chambers 43, 44 of the hydraulic actuator 4', and the air sucking control valve 5 receives an electrical signal such that the air sucking control valve 5 can supply the hydraulic fluid to the hydraulic chamber 43, 44 of the hydraulic actuator 4'. Thus, the hydraulic fluid can circulate through two paths. One path is from the hydraulic tank 1 via the suction circuit 9, hydraulic pump 2, primary pressure circuit 10, air sucking control valve 5, air sucking hydraulic circuit 8', and check valve 6, to the hydraulic chamber 43 of the hydraulic actuator 4', and from this hydraulic chamber 43 of the hydraulic actuator 4', the hydraulic fluid flows via the control hydraulic circuit 7 and control valve 3, back to the hydraulic tank 1. Another path is from the hydraulic tank 1 via the suction circuit 9, hydraulic pump 2, primary pressure circuit 10, air sucking control valve 5, air sucking hydraulic circuit 8', and check valve 6B, to the hydraulic chamber 44 of the hydraulic actuator 4', and from this hydraulic chamber 44 of the hydraulic actuator 4', the hydraulic fluid flows via the second control hydraulic circuit 7B, and second control valve 3B, back to the hydraulic tank 1. Thus, the air which exists in the hydraulic actuator 4' and the control hydraulic circuits 7, 7B will be exhausted into the hydraulic tank 1 by the circulation flow of the hydraulic fluid. During the air sucking operation, the control valve 3 and the second control valve 3B can both receive hydraulic fluid from the hydraulic actuator 4'. Thus, the pressure in the hydraulic actuator 4' will not increase, and the hydraulic actuator 4' will not operate. After the air sucking operation, the air sucking control valve 5 receives an electrical signal which causes it to close or the air sucking hydraulic circuit 8' can communicate with the circuit from the air sucking control valve 5' to the hydraulic tank 1. In normal operation, the check valves 6 and 6B are closed so that the hydraulic fluid can not flow into the air sucking hydraulic circuit 8' from the hydraulic actuator 4', thus the controllability of the hydraulic system will not be degraded.

In the case where more hydraulic actuators, more hydraulic chambers of the hydraulic actuator as well as more control valves and more control hydraulic circuits are used in the system, additional check valves and air sucking hydraulic circuits can be easily provided for the air sucking mechanism in the system.

As described above, according to the embodiment, even for the case of more control hydraulic circuits, a simple hydraulic circuit can perform the air sucking operation using only electrical signals from the control unit and can remove the air in the hydraulic system so as to prevent the degradation of the system controllability due to the pressure of air. Thus, a reliable hydraulic system is provided which can prevent a malfunction of the hydraulic actuator during the air sucking operation.

Another embodiment of the present invention will be described with reference to FIG. 3.

Figure 3:
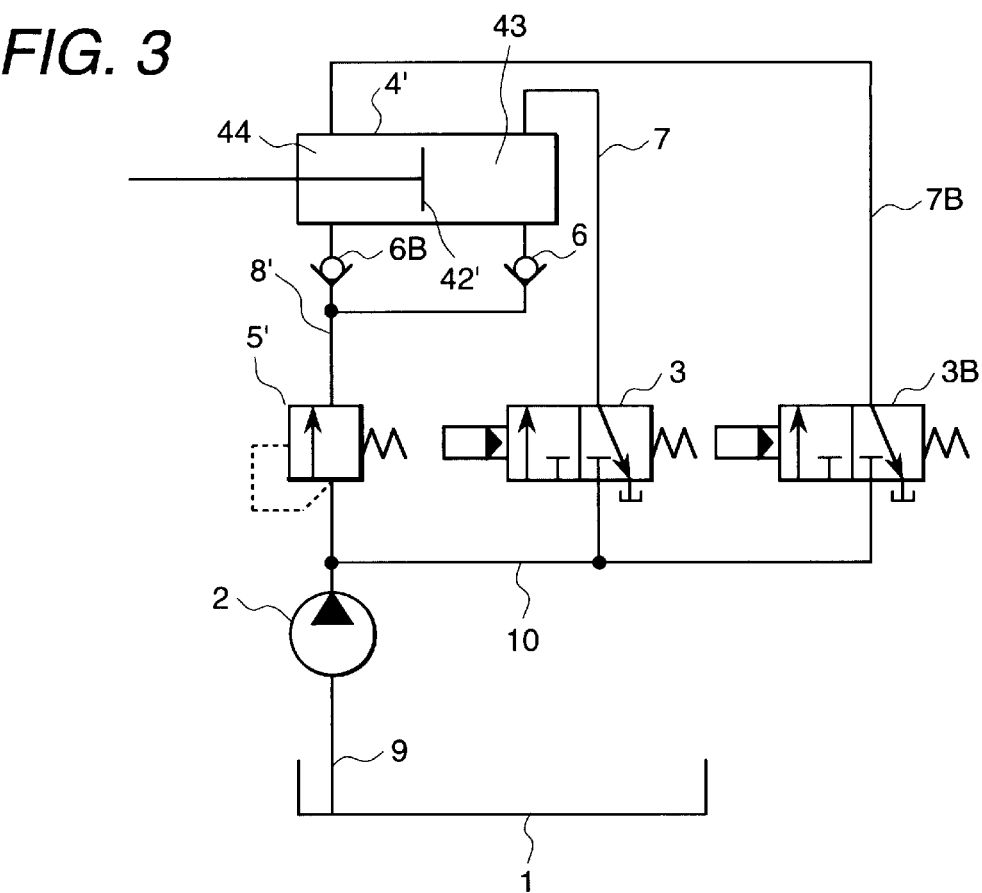
FIG. 3 is a schematic diagram showing still another example of a hydraulic system having an air sucking mechanism according to the present invention.

FIG. 3 shows an example of a hydraulic system according to the present invention using hydraulic symbols. A hydraulic tank 1 contains a hydraulic fluid. A hydraulic pump 2, which is driven by a power supply (not shown), can suck the hydraulic fluid from the hydraulic tank 1 via a suction circuit 9 and raise its pressure. The raised high pressure fluid is supplied to a control valve 3, second control valve 3B and air sucking control valve 5' through a primary pressure circuit 10. The (not shown) power supply is controlled by a control unit (not shown) such that the hydraulic pump 2 can supply hydraulic fluid to the primary pressure circuit 10 at a constant pressure.

The control valve 3 and second control valve 3B are activated by electrical signals received from a control unit (not shown), and they control the hydraulic fluid in response to the received signal. The control valve 3 and second control valve 3B supply the fluid to a hydraulic actuator 4' via a control hydraulic circuits 7 and 7B, respectively. Each of the control valve 3 and second control valve 3B may be a pressure control valve which can generate a hydraulic pressure in response to an electrical signal received from the (not shown) control unit, or a flow control valve which can generate a hydraulic flow in response to electrical signal received from the (not shown) control unit.

In the hydraulic actuator 4', a piston 42' will be pushed forward by the hydraulic fluid supplied from the control valve 3, and the piston 42' will be returned back by the hydraulic fluid supplied from the second control valve 3B. Each of hydraulic chambers 43, 44 of the hydraulic actuator 4' has another hydraulic fluid port which is connected to the air sucking control valve 5' via a check valve 6 or second check valve 6B and an air sucking hydraulic circuit 8'.

The check valve 6 and second check valve 6B can prevent flow of the hydraulic fluid from the hydraulic actuator 4' to the air sucking control valve 5' and allow a reverse flow of the hydraulic fluid from the air sucking control valve 5' to the hydraulic actuator 4'.

The air sucking valve 5' is a pressure control valve which can open at a certain pressure or more in the primary pressure circuit 10. The air sucking control valve 5' is set to open at a pressure above a primary pressure during normal operation.

In the above mentioned configuration according to the present invention, the air sucking operation from the hydraulic actuator 4' is as follows.

In the normal control operation of the hydraulic actuator 4, the control valve 3 can receive an electrical signal so as to supply hydraulic fluid into the hydraulic chamber 43 of the hydraulic actuator 4', and the second control valve 3B can receive an electrical signal so as to receive hydraulic fluid from the hydraulic chamber 44 of the hydraulic actuator 4'. The piston 42' of the hydraulic actuator 4' will be pushed forward by the hydraulic fluid supplied from the control valve 3. The control valve 3 and second control valve 3B can receive alternative signals such that the second control valve 3B will supply the hydraulic fluid to the hydraulic chamber 44 of the hydraulic actuator 4' and the control valve 3 will receive the hydraulic fluid from the hydraulic chamber 43 of the hydraulic actuator 4'. Thus, the piston 42' of the hydraulic actuator 4' will be returned back by the hydraulic fluid supplied from the second control valve 3B.

In the air sucking operation, the control valve 3 and second control valve 3B receive electrical signals such that the control valve 3 and second control valve 3B both receive hydraulic fluid from the hydraulic chambers 43, 44 of the hydraulic actuator 4', and the hydraulic pump 2 is activated to raise the primary pressure above a pressure during the normal operation to open the air sucking control valve 5'. Thus, the hydraulic fluid can circulate through two paths. One path is from the hydraulic tank 1 via the suction circuit 9, hydraulic pump 2, primary pressure circuit 10, air sucking control valve 5', air sucking hydraulic circuit 8', and check valve 6, to the hydraulic chamber 43 of the hydraulic actuator 4', and from this hydraulic chamber 43 of the hydraulic actuator 4, the hydraulic fluid flows via the control hydraulic circuit 7 and control valve 3, back to the hydraulic tank 1. Another path is from the hydraulic tank 1 via the suction circuit 9, hydraulic pump 2, primary pressure circuit 10, air sucking control valve 5', air sucking hydraulic circuit 8' and check valve 6B, to the hydraulic chamber 44 of the hydraulic actuator 4', and from this hydraulic chamber 44 of the hydraulic actuator 4', the hydraulic fluid flows via the second control hydraulic circuit 7B and second control valve 3B, back to the hydraulic tank 1. Thus, the air which exists in the hydraulic actuator 4' and the control hydraulic circuits 7, 7B will be exhausted into the hydraulic tank 1 by the circulation flow of the hydraulic fluid. During the air sucking operation, the control valve 3 and the second control valve 3B both receive hydraulic fluid from the hydraulic actuator 4'. Thus, the pressure in the hydraulic actuator 4' will not increase and the hydraulic actuator 4' will not operate. After the air sucking operation, the air sucking control valve 5' receives an electrical signal such that the air sucking control valve 5' can close, or the air sucking hydraulic circuit 8' can communicate with the circuit from the air sucking control valve 5' to the hydraulic tank 1. In the normal operation, the check valves 6 and 6B are closed so that the hydraulic fluid can not flow into the air sucking hydraulic circuit 8' from the hydraulic actuator 4', thus the controllability of the hydraulic system will not be degraded.

In the case where more hydraulic actuators, more hydraulic chambers of the hydraulic actuator as well as more control valves and more control hydraulic circuits are used in the system, additional check valves and air sucking hydraulic circuits can be easily provided for the air sucking mechanism in the system.

As described above, according to this embodiment, even in the case of more control hydraulic circuits, a simple hydraulic circuit can perform the air sucking operation only using the electrical signals from the control unit and can remove the air in the hydraulic system to prevent the degradation of the system controllability due to the presence of air. Thus, a reliable hydraulic system is provided which can prevent a malfunction of the hydraulic actuator during the air sucking operation.

Still other embodiments of the present invention will be described with reference to FIGS. 4 and 5.

Figure 4:
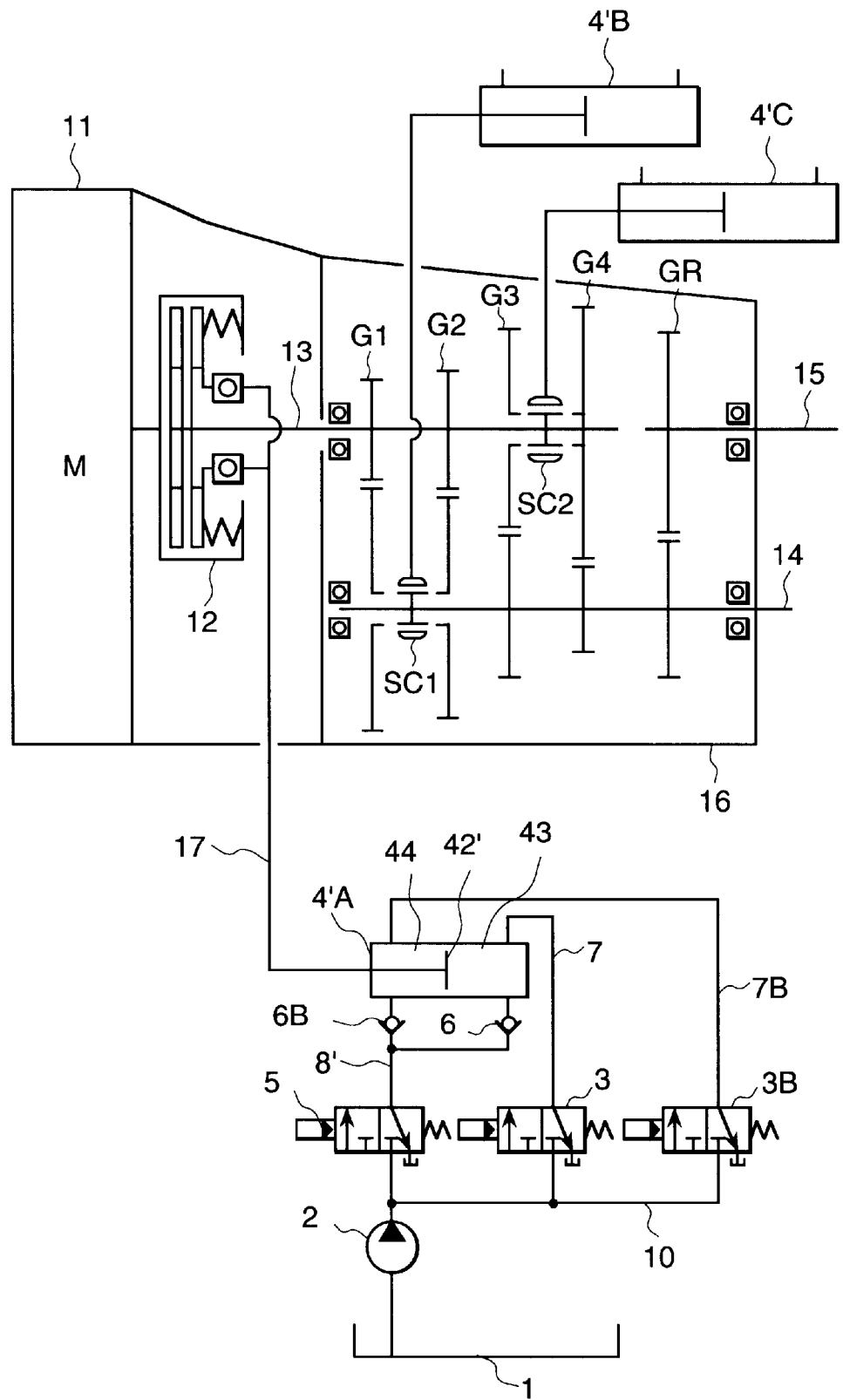
FIG. 4 is a schematic diagram showing an example of the use of a hydraulic system according to the present invention for a clutch operation or variable clutch operation in an automobile automatic transmission.

FIG. 4 shows an example of a hydraulic system according to the present invention which is used for a clutch operation or variable clutch operation of an automobile automatic transmission.

The output of an engine 11 is transmitted to a clutch 12. A first hydraulic actuator 4'A can control engagement and disengagement of the clutch 12. When the clutch 12 is engaged, the output of the engine 11 is transmitted to an input axis 13 of the transmission 16. The transmission 16 has gear pairs for speed reduction to each speed level, namely, G1 for a 1st speed, G2 for a 2nd speed, G3 for a 3rd speed, and G4 for a 4th speed. A first transmission clutch SC1 and second transmission clutch SC2 select a single gear pair. Only the selected gear pair can transmit the power. Non-selected gear pairs run idle and can not transmit power. The speed is further reduced by a speed reduction gear pair GR in the transmission 16. The engine power is output from an output axis 15 of the transmission 16 to drive the wheels of an automobile (not shown).

A second hydraulic actuator 4'B can control the first transmission clutch SC1, and a third hydraulic actuator 4'C can control the second transmission clutch SC2. In the hydraulic system for activating the first hydraulic actuator 4'A, a hydraulic tank 1 contains a hydraulic fluid. A hydraulic pump 2, which is driven by a power supply (not shown), can suck the hydraulic fluid from the hydraulic tank 1 via a suction circuit 9 and raise its pressure. The raised high pressure fluid is supplied to a control valve 3 and a second control valve 3B through a primary pressure circuit 10. The (not shown) power supply is controlled by a control unit (not shown) such that the hydraulic pump 2 can supply the hydraulic fluid to the primary pressure circuit 10 at a constant pressure. The control valve 3 and second control valve 3B are activated by electrical signals supplied from a control unit (not shown) and can control the hydraulic fluid in response to the received signal. The control valve 3 and second control valve 3B operate to supply fluid to the hydraulic actuator 4'A. Each of the control valve 3 and second control valve 3B may be a pressure control valve which can generate a hydraulic pressure in response to an electrical signal received from the (not shown) control unit, or a flow control valve which can generate a hydraulic flow in response to an electrical signal received from the (not shown) control unit.

In the hydraulic actuator 4'A, a piston 42' will be pushed forward by the hydraulic fluid supplied from the control valve 3, and the piston 42' will be returned back by the hydraulic fluid supplied from the second control valve 3B. Each of hydraulic chambers 43, 44 of the hydraulic actuator 4'A has another hydraulic fluid port which is connected to the air sucking control valve 5 via a check valve 6 or second check valve 6B and an air sucking hydraulic circuit 8'.

The check valve 6 and second check valve 6B can prevent flow of the hydraulic fluid from the hydraulic actuator 4'A to the air sucking control valve 5 and allow a reverse flow of the hydraulic fluid from the air sucking control valve 5 to the hydraulic actuator 4'A.

The air sucking control valve 5 may be a pressure control valve which can generate a hydraulic pressure in response to an electrical signal received from the (not shown) control unit, or a flow control valve which can generate a hydraulic flow in response to an electrical signal received from the (not shown) control unit, or an on/off control valve which can turn on/off the flow of the hydraulic fluid in response to an electrical signal received from the (not shown) control unit.

Although a hydraulic system is not shown for the second hydraulic actuator 4'B and the third hydraulic actuator 4'C, the primary pressure circuit 10 and the air sucking hydraulic circuit 8' have branches for the second and third hydraulic actuators 4'B and 4'C. Each of the second and third hydraulic actuators 4'B and 4'C is also provided with a control valve, second control valve, check valve and second control valve as in the case of the first hydraulic actuator 4'A.

Figure 5:
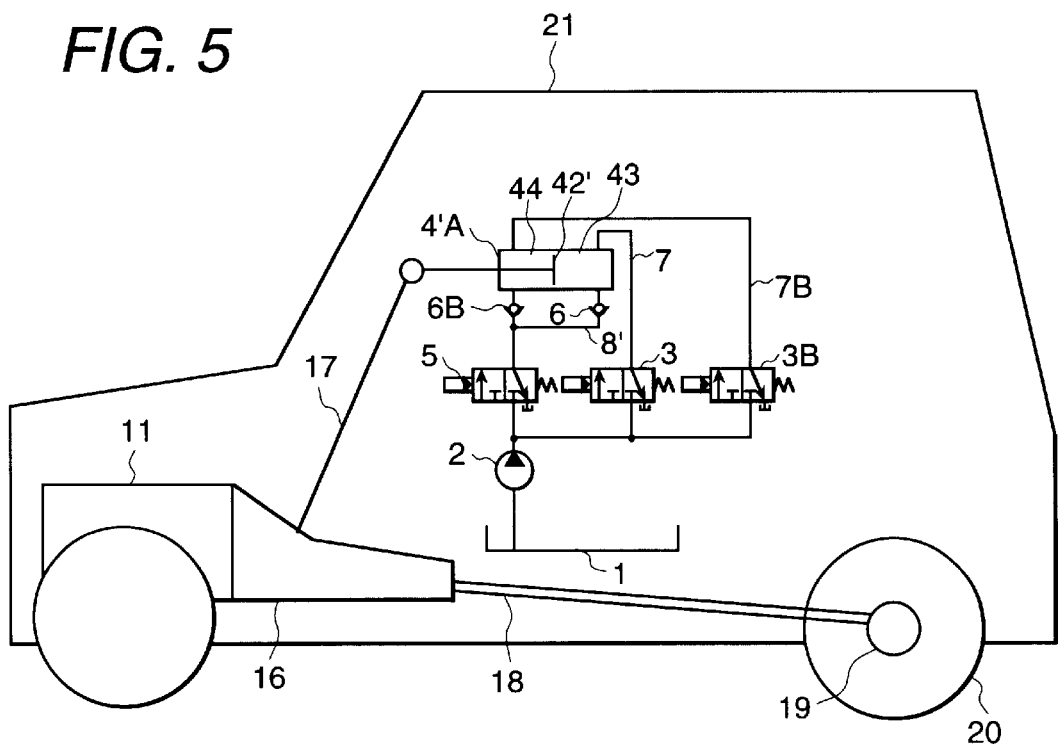
FIG. 5 is a schematic diagram showing an example of an automobile having an automatic transmission using a hydraulic system having an air sucking mechanism according to the present invention.

FIG. 5 shows an example of a hydraulic system according to the present invention installed in an automobile. Only the first hydraulic actuator 4'A is shown in FIG. 5, and the second hydraulic actuator 4'B, the third hydraulic actuator 4'C and the hydraulic systems including the actuators are not shown. The output of the transmission 16 is transmitted via a device shaft 18 to a final gear 19 for driving wheels 20 to accelerate/decelerate the automobile 21.

In the above mentioned configuration, according to the present invention, the air sucking operation from the hydraulic actuator 4'A (4'B, 4'C) is as follows. The hydraulic actuators 4'A, 4'B and 4'C are subjected to the same air sucking operation so that only the air sucking operation for the first hydraulic actuator 4'A will be described as a representative example.

In the normal control operation of the hydraulic actuator 4'A, the control valve 3 receives an electrical signal which causes it to supply hydraulic fluid into the hydraulic chamber 43 of the hydraulic actuator 4'A, and the second control valve 3B receives an electrical signal which causes it to receive hydraulic fluid from the hydraulic chamber 44 of the hydraulic actuator 4'A. The piston 42' of the hydraulic actuator 4'A will be pushed forward by the hydraulic fluid supplied from the control valve 3. The control valve 3 and second control valve 3B can receive alternative signals such that the second control valve 3B can supply the hydraulic fluid to the hydraulic chamber 44 of the hydraulic actuator 4'A and the control valve 3 can receive the hydraulic fluid from the hydraulic chamber 43 of the hydraulic actuator 4'A. Thus, the piston 42' of the hydraulic actuator 4'A will be returned back by the hydraulic fluid supplied from the second control valve 3B.

In the air sucking operation, the control valve 3 and second control valve 3B both receive electrical signals such that the control valve 3 and second control valve 3B can receive the hydraulic fluid from the hydraulic chambers 43, 44 of the hydraulic actuator 4'A, and the air sucking control valve 5 receives an electrical signal which causes it to supply hydraulic fluid to the hydraulic chamber 43, 44 of the hydraulic actuator 4'A. Thus, the hydraulic fluid can circulate through two paths. One path is from the hydraulic tank 1 via the suction circuit 9, hydraulic pump 2, primary pressure circuit 10, air sucking control valve 5, air sucking hydraulic circuit 8' and check valve 6, to the hydraulic chamber 43 of the hydraulic actuator 4'A, and from this hydraulic chamber 43 of the hydraulic actuator 4'A, the hydraulic fluid flows via the control hydraulic circuit 7 and control valve 3, back to the hydraulic tank 1. Another path is from the hydraulic tank 1 via the suction circuit 9, hydraulic pump 2, primary pressure circuit 10, air sucking control valve 5, air sucking hydraulic circuit 8' and check valve 6B, to the hydraulic chamber 44 of the hydraulic actuator 4'A, and from this hydraulic chamber 44 of the hydraulic actuator 4'A, the hydraulic fluid flows via the second control hydraulic circuit 7B and second control valve 3B, back to the hydraulic tank 1. Thus, the air which exists in the hydraulic actuator 4'A or the control hydraulic circuits 7, 7B will be exhausted into the hydraulic tank 1 by the circulation flow of the hydraulic fluid.

During the air sucking operation, both the control valve 3 and the second control valve 3B can receive the hydraulic fluid from the hydraulic actuator 4. Thus, the pressure in the hydraulic actuator 4' will not increase and the hydraulic actuator 4' will not operate. After the air sucking operation, the air sucking control valve 5 receives an electrical signal which causes the air sucking control valve 5 to close or the air sucking hydraulic circuit 8' can communicate with the circuit from the air sucking control valve 5 to the hydraulic tank 1. In the normal operation, the check valve 6 and 6B are closed so that the hydraulic fluid can not flow into the air sucking hydraulic circuit 8' from the hydraulic actuator 4'A, thus the controllability of the hydraulic system will not be degraded.

As described above, according to this embodiment, even for the case of more control hydraulic circuits, a simple hydraulic circuit can perform the air sucking operation only using the electrical signals from the control unit and can remove the air in the hydraulic system to prevent the degradation of the system controllability due to the presence of air. Thus, a reliable hydraulic system is provided which can prevent a malfunction of the hydraulic actuator during the air sucking operation.

In the case of a hydraulic actuator installed in an automobile automatic transmission, the response delay of the hydraulic actuator due to the compressibility of the air in the hydraulic system would provide a control time lag which may cause problems, such as transmission shock. Therefore, the air in the hydraulic circuit must be exhausted to ensure a quick response of the hydraulic actuator. However, it is very difficult to suck the air from the hydraulic system, because the automatic transmission is generally mounted on the underbody of the automobile. According to the present invention, an automatic transmission can be provided which can automatically perform the air sucking operation under control of a program in a control unit and always ensure a quick response of the hydraulic actuator and prevent a runaway automobile caused by a malfunction of the hydraulic actuator during the air sucking operation. The present invention can also provide an automobile in which such an automatic transmission is mounted.

According to the present invention, the control valve can receive hydraulic fluid from the hydraulic actuator during the air sucking operation, so that the pressure in the hydraulic actuator will not increase and the hydraulic actuator will not operate. In normal operation, the check valve is closed so that the hydraulic fluid can not flow into the air sucking hydraulic circuit from the hydraulic actuator, and the controllability of the hydraulic system will not be degraded. Thus, a reliable hydraulic system using a simple configuration can be provided.

What is claimed is:

1. A hydraulic system comprising,
    a hydraulic actuator activated by a supplied hydraulic fluid;
    a control valve for generating a regulated hydraulic pressure or flow for activating said hydraulic actuator; and
    a control hydraulic circuit for transmitting said regulated hydraulic pressure or flow generated by said control valve to said hydraulic actuator,
    wherein said hydraulic system further comprising,
        an air sucking control valve connected to a primary pressure circuit or regulated pressure circuit;
        an air sucking hydraulic circuit directly connecting said air sucking control valve to said hydraulic actuator; and
        a check valve provided in said air sucking hydraulic circuit between said air sucking control valve and said hydraulic actuator, allowing a flow of a hydraulic fluid from said air sucking control valve to said hydraulic actuator and preventing a flow of a hydraulic fluid from said hydraulic actuator to said air sucking control valve.

2. A hydraulic system comprising,
    a plurality of hydraulic chambers provided in at least one hydraulic actuator activated by a supplied hydraulic fluid;
    a plurality of control valves corresponding to said plurality of hydraulic chambers, said control valves generating a regulated hydraulic pressure or flow for activating said hydraulic actuator; and
    a plurality of control hydraulic circuits transmitting said regulated hydraulic pressure or flow generated by said plurality of control valves to each of said plurality of hydraulic chambers,
    wherein said hydraulic system further comprising,
        an air sucking control valve connected to a primary pressure circuit or regulated pressure circuit; and
        an air sucking hydraulic circuit connecting said air sucking control valve to said hydraulic actuator, said air sucking hydraulic circuit having branches connected to said plurality of hydraulic chambers, each branch being connected to each of said plurality of hydraulic chambers via a check valve allowing a flow of a hydraulic fluid from said air sucking control valve to said hydraulic actuator and preventing a flow of a hydraulic fluid from said hydraulic actuator to said air sucking control valve.

3. A hydraulic system according to claim 1 or 2, wherein said air sucking control valve is a pressure control valve which can open at a supplied pressure higher than or equal to a certain value.

4. A hydraulic system comprising,
- a hydraulic chamber having an inflow and outflow of a hydraulic fluid therefrom;
- a hydraulic actuator activated by the inflow and outflow of said hydraulic fluid from said hydraulic chamber;
- a first control valve controlling the inflow and outflow of said hydraulic fluid from said hydraulic chamber;
- a second control valve controlling only the inflow of said hydraulic fluid to said hydraulic actuator;
- a check valve between said hydraulic chamber and said second control valve, allowing a flow of a hydraulic fluid from said second control valve to said hydraulic chamber and preventing a flow of a hydraulic fluid from said hydraulic chamber to said second control valve; and
- a control system controlling said first control valve in such a way for a hydraulic fluid to flow out of said hydraulic chamber and controlling said second control valve in such a way for a hydraulic fluid to flow in said hydraulic chamber.

5. An automobile having a hydraulic system comprising,
- a hydraulic actuator activated by a supplied hydraulic fluid;
- a plurality of control valves generating a regulated hydraulic pressure or flow for a plurality of hydraulic chambers provided in at least one hydraulic actuator for activating said hydraulic actuator; and
- a plurality of control hydraulic circuits transmitting said regulated hydraulic pressure or flow generated by said plurality of control valves to said hydraulic actuator, wherein said hydraulic system further comprising,
- an air sucking control valve connected to a primary pressure circuit or regulated pressure circuit; and
- an air sucking hydraulic circuit connecting said air sucking control valve to said hydraulic actuator,
- said air sucking hydraulic circuit having branches connected to said plurality of hydraulic chambers, each branch being connected to each of said plurality of hydraulic chambers via a check valve allowing a flow of a hydraulic fluid from said air sucking control valve to said hydraulic actuator and preventing a flow of a hydraulic fluid from said hydraulic actuator to said air sucking control valve.

* * * * *